United States Patent
Tanguy et al.

(10) Patent No.: US 9,840,337 B2
(45) Date of Patent: Dec. 12, 2017

(54) METHOD AND DEVICE FOR ACTIVATING THE DISPLAY OF AT LEAST ONE STALL MARGIN INDICATOR OF AN AIRCRAFT

(71) Applicant: Airbus Operations (SAS), Toulouse (FR)

(72) Inventors: Alain Tanguy, Plaisance du Touch (FR); Thierry Bourret, Toulouse (FR); Florent Lanterna, Toulouse (FR); Matthieu Boitrel, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/164,213

(22) Filed: May 25, 2016

(65) Prior Publication Data

US 2016/0347468 A1 Dec. 1, 2016

(30) Foreign Application Priority Data

Jun. 1, 2015 (FR) ...................................... 15 54924

(51) Int. Cl.
*B64D 43/02* (2006.01)
*G01C 1/00* (2006.01)

(52) U.S. Cl.
CPC ............... *B64D 43/02* (2013.01); *G01C 1/00* (2013.01)

(58) Field of Classification Search
None
See application file for complete search history.

(56) References Cited

U.S. PATENT DOCUMENTS

| | | | | |
|---|---|---|---|---|
| 3,586,268 A * | 6/1971 | Melvin | ................ | G05D 1/0676 244/181 |
| 3,686,936 A * | 8/1972 | Daudt, Jr. | .............. | B64D 43/02 340/966 |
| 4,235,104 A * | 11/1980 | Hoadley | ................... | G01P 3/62 73/180 |
| 4,685,643 A * | 8/1987 | Henderson | ................ | B64C 7/02 244/199.1 |
| 4,910,513 A * | 3/1990 | Kelly | ................... | G05D 1/0607 340/966 |
| 5,341,677 A * | 8/1994 | Maris | .................... | G01M 9/065 340/966 |
| 5,803,408 A * | 9/1998 | Gast | ..................... | G05D 1/0607 244/178 |
| 9,096,328 B2 * | 8/2015 | Pitard | .................. | G07C 5/0825 |
| 9,099,012 B2 * | 8/2015 | Testrake | ................ | G01C 23/00 |
| 9,304,499 B2 * | 4/2016 | Schott | .................... | G01P 13/025 |

(Continued)

FOREIGN PATENT DOCUMENTS

EP 1460385 9/2004

OTHER PUBLICATIONS

French Search Report, dated Apr. 20, 2016 priority document.

Primary Examiner — Fekadeselassie Girma
(74) Attorney, Agent, or Firm — Greer, Burns & Crain, Ltd.

(57) ABSTRACT

An activation device comprising a computation unit configured to compute a stall margin of the aircraft, an information reception unit configured to receive information indicating if an automatic angle-of-attack protection system of the aircraft is active or inactive, and an activation unit configured to activate the display of the stall margin indicator only if the automatic angle-of-attack protection system is inactive.

14 Claims, 2 Drawing Sheets

(56) References Cited

U.S. PATENT DOCUMENTS

| | | | | |
|---|---|---|---|---|
| 9,567,099 | B2 * | 2/2017 | Poux | G08G 5/0021 |
| 9,586,695 | B2 * | 3/2017 | Voros | B64C 13/10 |
| 2002/0171563 | A1 * | 11/2002 | Djorup | G01P 5/12 |
| | | | | 340/968 |
| 2004/0183699 | A1 * | 9/2004 | Vialleton | B64D 43/02 |
| | | | | 340/978 |
| 2008/0237393 | A1 * | 10/2008 | Challis | B64C 27/22 |
| | | | | 244/17.21 |
| 2010/0258678 | A1 * | 10/2010 | Fermor | B64D 43/02 |
| | | | | 244/196 |
| 2011/0272519 | A1 * | 11/2011 | Challis | B64C 27/26 |
| | | | | 244/6 |
| 2013/0345910 | A1 * | 12/2013 | Kerho | B64D 43/02 |
| | | | | 701/14 |
| 2014/0371957 | A1 * | 12/2014 | Riedinger | B64D 43/02 |
| | | | | 701/3 |
| 2015/0083855 | A1 * | 3/2015 | Moser | B64C 9/16 |
| | | | | 244/1 N |
| 2016/0257415 | A1 * | 9/2016 | Ye | B64D 3/00 |
| 2016/0298985 | A1 * | 10/2016 | Genito | G01C 23/00 |
| 2016/0318622 | A1 * | 11/2016 | Haukom | B64D 45/00 |

* cited by examiner

METHOD AND DEVICE FOR ACTIVATING THE DISPLAY OF AT LEAST ONE STALL MARGIN INDICATOR OF AN AIRCRAFT

CROSS-REFERENCES TO RELATED APPLICATIONS

This application claims the benefit of the French patent application No. 1554924 filed on Jun. 1, 2015, the entire disclosures of which are incorporated herein by way of reference.

BACKGROUND OF THE INVENTION

The present invention relates to a method and a device for activating the display of at least one stall margin indicator of an aircraft, in particular of a transport airplane.

In order to reinforce the vigilance of crew members to aircraft stall situations, it is known practice to use stall margin indicators. The stall margin information is supplied to the pilots via a permanent display on their primary attitude instruments.

It is known practice to use a chevron centered on a primary flight readout, which indicates the stall margin and the direction of the aircraft recovery maneuver in the case of a stall. A stall margin indicator is also known that takes the form of markers situated laterally on the same type of readout. The stall margin of these two representations is materialized by the distance between the bottom point of the symbol or symbols and the model of the aircraft, centered on the primary flight readout.

The stall margin indicators complement the existing stall indicators, the presence of which is dictated by the regulations. In the symbology employed, the stall margin indicator is a piloting symbol completely apart. Because of this and even more than what may be required of a text message or an audio alert, the information transmitted by this symbol has to be very accurate, to make it possible to perform an emergency maneuver when that proves necessary.

The stall margin indicator allows prevention or else involves an immediate corrective action to reduce the angle-of-attack of the aircraft on the part of the pilot when the stall margin decreases dangerously or becomes zero. The need for a preventive or corrective maneuver is however required only if the incidence of the aircraft is no longer protected by the usual systems, because the pilots can use the full authority of their stick without the risk of exceeding the aircraft's stability limits

SUMMARY OF THE INVENTION

An object of the present invention is to provide specific conditions for activation of such a stall margin indicator. It relates to a method for activating the display of at least one stall margin indicator on at least one screen of a cockpit of an aircraft, the stall margin indicator being positioned on the screen at a distance from a symbol illustrating a parameter (trim, speed vector, . . . ) of the aircraft, which is representative of the stall margin, the method comprising the following step comprising:

A) computing a stall margin of the aircraft.

According to the invention, the method comprises the following additional steps comprising:

B) receiving information indicating if an automatic angle-of-attack protection system of the aircraft is active or inactive; and C) activating the display of the stall margin indicator, only if the automatic angle-of-attack protection system is inactive.

In the context of the invention:
"activation of the display" should be understood to mean a display command whose purpose is to have the stall margin indicator displayed on the screen; and
"disabling of the activation of the display" should be understood to mean a display command whose purpose is to clear the display of the stall margin indicator from the screen.

Thus, by virtue of the invention, the stall margin indicator is not displayed permanently, but only when necessary for the piloting. More specifically, the stall margin indicator is displayed only if the angle-of-attack protection system is inactive, because it is in that situation that the pilot needs a piloting assistance of this type.

Advantageously, the activation of the display of the stall margin indicator is disabled, if step A) of computation of the aircraft stall margin does not have sufficient information to perform the margin computation.

According to different embodiments of the invention, which can be taken together or separately:
- the method comprises a first auxiliary step comprising computing a consolidated angle-of-attack, step A) using the consolidated angle-of-attack computed in the first auxiliary step for the implementation thereof;
- the consolidated angle-of-attack is deduced from a monitored angle-of-attack obtained by checking the validity of a plurality of angle-of-attack computation sources of the aircraft and/or of an estimated angle-of-attack;
- the method comprises a second auxiliary step comprising computing a consolidated Mach number of the aircraft, step A) using the consolidated Mach number for the implementation thereof;
- the consolidated Mach number is deduced from a monitored Mach number obtained by checking the validity of a plurality of Mach number computation sources of the aircraft and/or of an estimated Mach number;
- step A) comprises computing the stall margin from the consolidated angle-of-attack and from the consolidated Mach number;
- the method comprises an additional step of management of at least one stall prevention device, the additional management step using, for the implementation thereof, the stall margin computed in step A);
- the stall prevention device corresponds to at least one of the following elements: a stall audio alert, a stall text alert, an anti-stall stick shaker, an anti-stall stick pusher and a stall limit speed indicator;
- the activation of the display of the stall margin indicator is disabled if the current Mach number of the aircraft is outside of a predetermined range;
- a symbology of the stall margin indicator is variable and a function of the stall margin value.

The invention relates also to a device for activating the display of at least one stall margin indicator on at least one screen of a cockpit of an aircraft, the stall margin indicator being positioned on the screen at a distance from a symbol that can serve to materialize the stall margin, for example a symbol illustrating the trim or a speed vector of the aircraft, the activation device comprising a unit for computing a stall margin of the aircraft.

According to the invention, the activation device also comprises:

an information reception unit configured to receive information indicating if an automatic angle-of-attack protection system of the aircraft is active or inactive; and
an activation unit configured to activate the display of the stall margin indicator only if the automatic angle-of-attack protection system is inactive.

The invention further relates to a stall management assembly, comprising at least one display system and an activation device as described above.

The invention relates also to an aircraft comprising an activation device and/or a stall management assembly, such as those described previously.

BRIEF DESCRIPTION OF THE DRAWINGS

The features of the invention mentioned above, and others, will become more clearly apparent on reading the following description of exemplary embodiments, the description being given in relation to the attached drawings, in which.

DETAILED DESCRIPTION OF THE PREFERRED EMBODIMENTS

Figure 1:
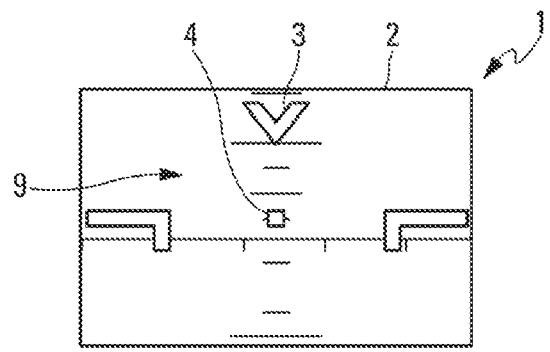
FIG. 1 schematically represents a display screen on which is displayed a stall margin indicator of an aircraft.

A display system 1 of a cockpit of an aircraft is illustrated in FIG. 1. The display system 1 comprises a display unit provided with a screen 2. It is a primary flight readout, on which is represented a stall margin indicator 3, here a chevron, which indicates the stall margin and the direction of the aircraft recovery maneuver in the case of a stall. The stall margin is materialized, when the stall margin indicator 3 is displayed, by the distance between the bottom point of the stall margin indicator 3 and a symbol 4 illustrating the aircraft, centered on the screen 2. This screen 2 also comprises a trim scale 9.

The stall margin is, preferably, defined relative to the trim of the aircraft, as in the example of FIG. 1. However, in the context of the present invention, it can also be defined relative to other parameters (or references) such as the speed vector of the aircraft, for example.

The display system 1 forms part of a stall management assembly 14.

Figure 2:
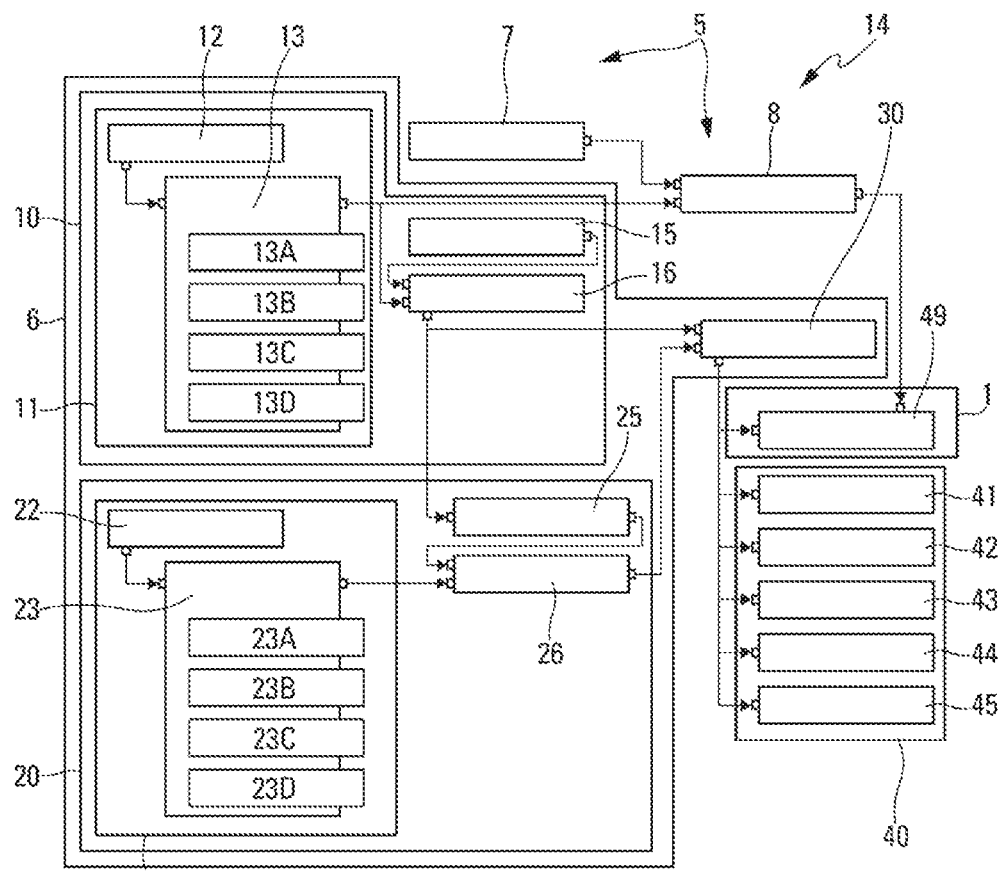
FIG. 2 is the block diagram of a particular embodiment of an assembly comprising a device for activating the display of a stall margin indicator of an aircraft.

This assembly 14 which is embedded in the aircraft, comprises a device 5 for activating the display of the stall margin indicator 3 on the screen 2, as represented in FIG. 2.

This activation device 5 comprises a computation unit 6 for computing the stall margin of the aircraft.

The assembly 14 also comprises an angle-of-attack protection system 7, of the usual type, that can be active or inactive depending on the failures identified by embedded systems on the aircraft. The automatic angle-of-attack protection system 7 is configured, in the usual manner, to automatically prevent a stall of the aircraft when it is active.

According to the invention, the activation device 5 further comprises an activation unit 8 for activating the display of the stall margin indicator 3, and does so only if the automatic angle-of-attack protection system 7 is inactive. To do this, the activation device 5 comprises an information reception unit (incorporated for example in the activation unit 8) receiving information from the automatic angle-of-attack protection system 7 of the aircraft, indicating if it is active or inactive.

When the automatic angle-of-attack protection system 7, making it possible to automatically prevent a stall of the aircraft, is active (and operating normally), there is no point in displaying the stall margin indicator 3. On the other hand, when it is inactive, the stall margin indicator 3 is displayed on the screen 2 to assist the pilots.

In a preferred embodiment, the activation unit 8 is configured to disable (or deactivate) the display of the stall margin indicator 3, if the stall margin computation unit 6 does not have sufficient information to perform the margin computation. In fact, in this case, it will not be possible to display a stall margin indicator that is reliable and accurate, and it is preferable not to show this information to the pilots.

The activation device 5 comprises a unit 10 for calculating a consolidated angle-of-attack of the aircraft. The calculation unit 6 uses this consolidated angle-of-attack, calculated by the unit 10, to calculate the stall margin.

To calculate the consolidated angle-of-attack, the unit 10 comprises a unit 11 for calculating a monitored angle-of-attack. This can further comprise a unit 15 for calculating an estimated angle-of-attack.

The unit 11 for calculating the monitored angle-of-attack comprises a unit 12 for monitoring the angle-of-attack and a unit 13 for determining the validity of a plurality of sources each calculating an angle-of-attack of the aircraft, such as, for example, the sources 13A, 13B, 13C, 13D of FIG. 1.

The unit 12 monitors each source of angle-of-attack and the unit 13 validates each source of angle-of-attack.

Moreover, the unit 15 performs an estimation of the angle-of-attack of the aircraft, from information such as the current slope of the aircraft, its pitch, and other flight parameters. It provides a different source of information.

The calculation unit 6 also comprises a unit 16 combining the information from the units 11 and 15 so as to calculate a consolidated angle-of-attack.

The activation device 5 also comprises a unit 20 for calculating a consolidated Mach number of the aircraft. The calculation unit 6 uses the consolidated Mach number, calculated by the unit 20, to calculate the stall margin.

To calculate the consolidated Mach number, the unit 20 comprises a unit 21 for calculating a monitored Mach number. It can also comprise a unit 25 for calculating an estimated Mach number.

Figure 4:
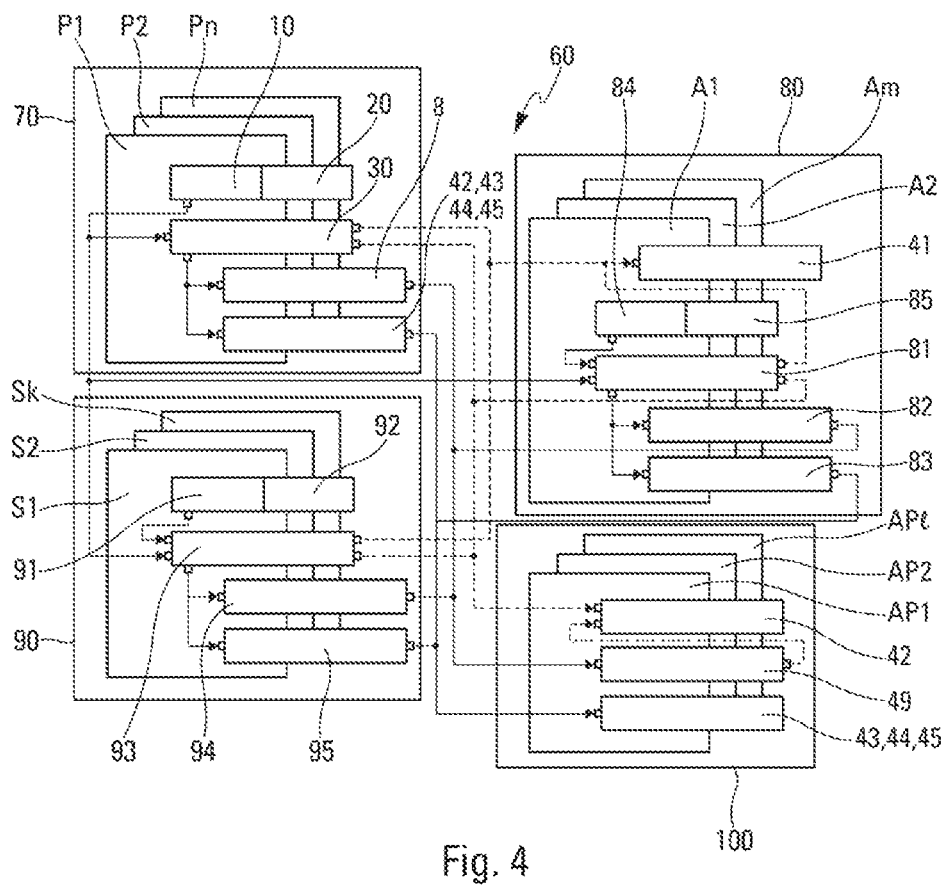
FIG. 4 represents a block diagram of an embodiment showing an exemplary incorporation of an activation device in an aircraft system architecture.

Furthermore, the unit 21 for calculating the monitored Mach number comprises a Mach number monitoring unit 22 and a unit 23 for determining the validity of a plurality of sources each calculating a Mach number, such as, for example, the sources 23A, 23B, 23C, 23D of FIG. 4.

The unit 22 monitors each Mach number source and the unit 23 validates each Mach number source.

The unit 25 can take into account angle-of-attack information or information from other embedded sources of information to calculate a Mach independent of the sources 23A, 23B, 23C and 23D.

The calculation unit 6 also comprises a unit 26 combining the information from the units 21 and 25 so as to calculate the consolidated Mach number.

In a particular embodiment, the calculation unit 6 is configured to calculate the stall margin from the consolidated angle-of-attack and from the consolidated Mach number. For that, it comprises a unit 30 combining the information from the units 10 and 20 so as to calculate a consolidated stall margin.

Moreover, the activation device 5 comprises a set 40 of stall prevention or alert devices (or anti-stall device) which use the stall margin calculated by the calculation unit 6 and received from the unit 30.

The set 40 comprises a stall audio alert device 41, a stall text alert device 42, an anti-stall stick shaking device 43, an anti-stall stick pusher device 44 and/or a device (or indicator) 45 for displaying a stall limit speed.

The grouping together of all the stall prevention and alert devices within the same stall prevention set 40 makes it possible to guarantee the synchronization of each of the associated effects in the cockpit: the appearance of the alert text, the audio alert, the materialization of a zero margin via the stall margin indicator, the shaking of the stick or the activation of the stick pusher, entry into the stall speed limit. The appearance of these effects simultaneously in the cockpit reinforces the understanding of the situation by the crew. Conversely, a disorderly appearance of the alert means could lead to an increase in the workload of the crew. The alerts that use a display (text alert, etc.) can produce the corresponding display on the screen 2 (FIG. 1), on an already existing screen on the aircraft and/or on a dedicated screen.

In one or more particular embodiments, the stall prevention and alert devices are linked to the activation unit 8.

According to one embodiment, the activation unit 8 is configured to disable the activation of the display of the stall margin indicator if the Mach number of the aircraft is outside of a predetermined range (of Mach number values).

This embodiment is particularly advantageous when the stall margin is not adjusted according to the Mach number and a fixed stall angle-of-attack 50 is used over the entire flight domain. The accuracy of the stall margin information is not then uniform over the entire range of speeds at which the aircraft can fly.

Figure 3:
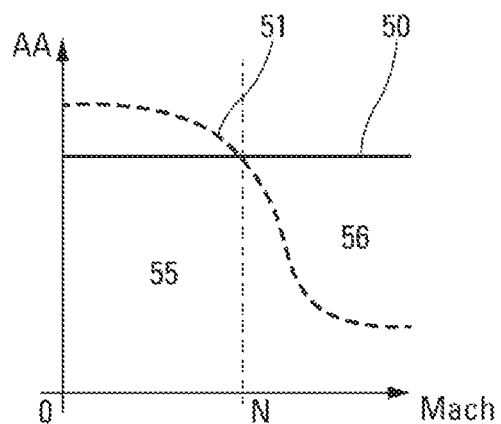
FIG. 3 is a graph showing a condition for activation of the display of a stall margin indicator.

FIG. 3 shows such an example of a curve 51 of stall angle-of-attack AA as a function of the Mach number of an aircraft, when the stall margin is not adjusted according to the Mach number and a fixed stall angle-of-attack 50 is used over the entire flight domain.

On this curve 51, it can be seen that, in a first Mach number range 55 ranging from 0 to N, the accuracy of the stall margin is sufficient for the activation unit 8 to allow the display of the stall margin indicator.

On the other hand, in a second Mach number range 56, that is to say beyond the Mach number value N, the stall margin accuracy is not sufficient and the activation unit 8 disables the display of the stall margin indicator.

According to one embodiment, a symbology of the stall margin indicator 3 is variable and a function of the stall margin value. It can notably change form, size and/or brightness. For example, the symbology of the stall margin indicator can be reinforced (visually) when the stall margin decreases. In a particular embodiment, the chevron (illustrating the indicator) which is usually of amber color is, for example, displayed in red if the stall margin becomes zero or negative. Similarly, the position of the stall margin indicator 3 can be adjusted so that its point is flush with the symbol 4 of the aircraft centered on the primary attitude readout if the stall margin becomes zero. If the stall situation gets worse, it is also possible to make the stall margin indicator move under the symbol 4, by placing intermediate symbols reinforcing the understanding of the angle-of-attack reduction action expected of the crew.

An exemplary system architecture 60 of an aircraft making it possible to implement the invention is illustrated in FIG. 4.

This system architecture 60 comprises a set 70 of primary computers P1, P2, . . . , Pn, a set 80 of alarm computers A1, A2, . . . , Am, a set 90 of secondary computers, S1, S2, . . . , Sk and a set 100 of primary readouts AP1, AP2, . . . AP1. n, m, k and 1 are independent integers.

Each primary computer P1, P2, . . . , Pn of the set 70 comprises the unit 10 for calculating a consolidated angle-of-attack, the unit 20 for calculating a consolidated Mach number and the unit 30 combining the information from the units 10 and 20 so as to calculate the consolidated stall margin.

It further comprises the unit 8 for activating the display of the margin indicator and the stall prevention devices 42, 43, 44, 45.

The set 70 is said to be primary because it constitutes the main device on board the aircraft for monitoring and consolidating the data used by all the stall prevention and alert devices. This set, by grouping together the stall prevention and alert devices, guarantees their synchronization and their availability by means of the multiple occurrences of the available primary computers.

The set 80 of alarm computers A1, A2, . . . , Am is formed from a chain of computers responsible for the aircraft alarms. In a particular embodiment, it is dedicated to the calculation for the stall prevention and alert devices. In a preferred embodiment, the set 80 comprises a secondary unit 81 for calculating the stall margin. It further comprises a unit 82 for activating the display of the margin indicator and a unit 83 for managing at least one stall prevention device. It also comprises a unit 84 for calculating a monitored angle-of-attack and a unit 85 for calculating a monitored Mach number.

The purpose of this set 80 is to take control of all or some of the stall alert calculations when the primary set 70 is no longer operational. The redundancy present on the primary set 70 limits the probability of having to use this secondary chain.

In a particular embodiment, the system architecture 60 can show a perfect similarity between the units 30 and 81, 8 and 82 or even between 42, 43, 44, 45 on the one hand and unit 83 on the other hand A preferred embodiment comprises introducing a difference in calculation between these units. The stall margin from the unit 81 is then called backup. According to this solution, there is no need to introduce complex monitoring around parameters to allow the unit 81 to function. In effect, the loss of the primary chain together with failures of such information is extremely improbable.

In a particular embodiment, the units 10 and 20 of the set 70 can be put in place between the set 70 and the set 80, in order for the latter not to perform any calculation on the basis of errored information, rejected by the set 70 before it has been lost.

In a preferred embodiment, the set 80 can comprise the stall audio alert device 41. The device 41 receives its information from the consolidated stall margin calculation unit 30 of the set 70.

The stall alert devices managed by the set 80 and in particular the audio alert are thus synchronized with the other stall prevention and alert devices managed by the set 70, thus ensuring overall consistency in the cockpit.

In the absence of the set 70 of the primary calculation chain and in a preferred embodiment, the unit 81 of the set 80 receives information from the unit 84 for calculating a monitored angle-of-attack and from the unit 85 for calculating a monitored Mach number. The stall alert devices governed by the set 80 and in particular the audio alert are thus synchronized with the other stall prevention and alert devices governed by this set 80, thus ensuring overall consistency in the cockpit, even in the case of loss of the primary set 70. The set 81 feeds 41, 82 and 83 in the absence of the set 70.

The set 90 is involved in a particular embodiment of the invention. It comprises a unit 91 for calculating a monitored angle-of-attack and a unit 92 for calculating a monitored Mach number, and a unit 93 combining the information from the units 91 and 92 so as to calculate the secondary stall margin.

It further comprises a unit 94 for activating the display of the margin indicator and a unit 95 for managing at least one stall prevention device.

It is an alternative to the implementation of the set 80. In this embodiment, the device 41 of the set 80 is linked to the unit 93.

The set 100 produces the display of all the graphic components associated with the stall prevention and alert devices. In a variant embodiment, the device 42 adds text information indicating the stall situation to the pilots. A unit 49 controls the display of the stall margin indicator on the screen 2 of the display system 1 (FIGS. 1 and 2).

Thus, the text display produced by the device 42 can be triggered by the primary set 70, via the unit 30, to satisfy the need to synchronize the stall alert effects. In case of loss of the primary chain, the display of the device 42 can be triggered by one of the backup stall margin calculation devices 81, 93, depending on the embodiment concerned. In a preferred embodiment, the display of the device 42 is triggered when the stall margin transmitted by one of the units 8, 82 or 94 is zero or negative. This solution provides a simple way to guarantee the synchronization between the display of the text and the stall prevention and alert devices.

The display of a stall margin indicator 3 is generally managed by the set 70, via the unit 30, to satisfy the need to synchronize the effects of the stall alerts and consistency in the cockpit.

In case of loss of the set 70, the indicator 3 will be able to be positioned by one of the backup stall margin calculation devices 82, 94 depending on the embodiment concerned.

In a preferred embodiment of the invention, in case of complete loss of the device 41, only the anti-stall audio alert is lost and the stall margin indicator, the text alert and the other stall prevention devices 43, 44, 45 have their availability preserved.

The various links between the units described previously are as represented in FIGS. 2 and 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for activating the display of at least one stall margin indicator on at least one screen of a cockpit of an aircraft, said method comprising:
   A) computing a stall margin of the aircraft;
   B) receiving information indicating if an automatic angle-of-attack protection system of the aircraft is active or inactive; and
   C) activating the display of the stall margin indicator, only if the automatic angle-of-attack protection system is inactive, the displayed stall margin indicator being positioned on the screen at a distance from a symbol illustrating a parameter of the aircraft, which is representative of said stall margin, the stall margin being materialized by the distance.

2. The method as claimed in claim 1, wherein the activation of the display of the stall margin indicator is disabled if step A) does not have sufficient information to perform the computation of the stall margin.

3. The method as claimed in claim 1, said method comprising a first auxiliary step comprising computing a consolidated angle-of-attack, said step A) using said consolidated angle-of-attack computed in the first auxiliary step for the implementation thereof.

4. The method as claimed in claim 3, wherein said consolidated angle-of-attack is deduced from a monitored angle-of-attack obtained by at least one of checking the validity of a plurality of angle-of-attack computation sources of the aircraft or an estimated angle-of-attack.

5. The method as claimed in claim 1, said method comprising a second auxiliary step comprising computing a consolidated Mach number of the aircraft, said step A) using said consolidated Mach number for the implementation thereof.

6. The method as claimed in claim 5, wherein said consolidated Mach number is deduced from a monitored Mach number obtained by checking at least one of the validity of a plurality of Mach number computation sources of the aircraft or an estimated Mach number.

7. The method as claimed in claim 3, said method further comprising a second auxiliary step comprising computing a consolidated Mach number of the aircraft, wherein step A) comprises computing the stall margin from the consolidated angle-of-attack and from the consolidated Mach number.

8. The method as claimed in claim 1, said method comprising an additional step of management of at least one stall prevention device, said additional management step using, for the implementation thereof, the stall margin computed in step A).

9. The method as claimed in claim 8, wherein said stall prevention device corresponds to at least one of the following elements: a stall audio alert, a stall text alert, an anti-stall stick shaker, an anti-stall stick pusher and a stall limit speed indicator.

10. The method as claimed in claim 1, wherein the activation of the display of said stall margin indicator is disabled if the current Mach number of the aircraft is outside of a predetermined range.

11. The method as claimed in claim 1, wherein a symbology of the stall margin indicator is variable and a function of the stall margin value.

12. A device for activating the display of at least one stall margin indicator on at least one screen of a cockpit of an aircraft, said activation device comprising:

a unit for computing a stall margin of the aircraft;

an information reception unit configured to receive information indicating whether an automatic angle-of-attack protection system of the aircraft is active or inactive; and an activation unit configured to activate the display of the stall margin indicator only if the automatic angle-of-attack protection system is inactive, the displayed stall margin indicator being positioned on the screen at a distance from a symbol illustrating a parameter of the aircraft, which is representative of said stall margin, the stall margin being materialized by the distance.

13. A stall management assembly, comprising:

at least one display system, and a device for activating the display of at least one stall margin indicator on at least one screen of a cockpit of an aircraft, said activation device comprising:

a unit for computing a stall margin of the aircraft;

an information reception unit configured to receive information indicating whether an automatic angle-of-attack protection system of the aircraft is active or inactive; and an activation unit configured to activate the display of the stall margin indicator only if the automatic angle-of-attack protection system is inactive, the displayed stall margin indicator being positioned on the screen at a distance from a symbol illustrating a parameter of the aircraft, which is representative of said stall margin, the stall margin being materialized by the distance.

14. An aircraft comprising a stall management assembly as claimed in claim 13.

* * * * *